Patented Aug. 25, 1942

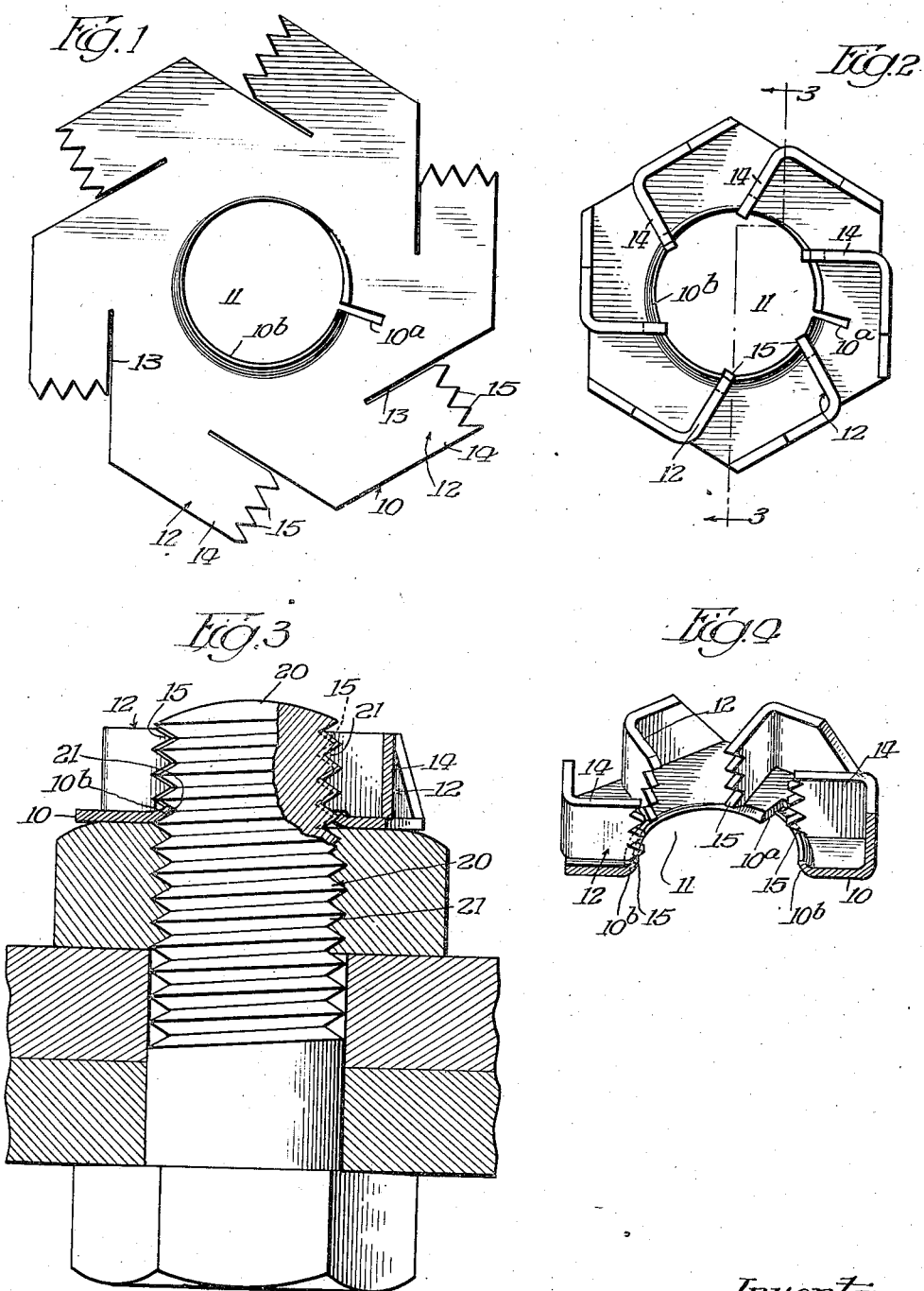

2,294,055

UNITED STATES PATENT OFFICE 2,294,055

NUTLIKE LOCKING ELEMENT

Arthur H. Thompson, Chicago, Ill., assignor to Thompson-Bremer & Co., Chicago, Ill., a corporation of Illinois Application October 30, 1939, Serial No. 301,932

2 Claims. (Cl. 151—14)

The invention relates to locking elements for screws.

One object of the invention is to provide an improved one-piece locking element which is formed of sheet or plate metal and comprises an apertured body or plate for engaging the work and an annular series of integral tongues which are slightly resilient, have their inner ends toothed or shaped to extend into the groove of the screw-thread, and extend in such angular directions that when the element is turned onto the screw to engage the work, the inner ends of the tongues will slide around the screw-thread and when the element is turned in the opposite direction the tongues will bite against the side faces of the screw-thread and effectively lock the element against rotation, and also comprises a helical portion around the hole or aperture in the plate shaped or formed to fit into one convolution of the groove of the screw-thread.

Another object of the invention is to provide a nut-like locking element which is extremely efficient in operation and is an improvement upon that which is shown in, and forms the subject matter of, my copending United States patent application filed June 14, 1939, and serially numbered 278,989.

Other objects of the invention will be apparent from a consideration of the following detailed description.

The invention consists in the several novel features which are hereinafter set forth and are more particularly defined by claims at the conclusion hereof.

In the drawing: Fig. 1 is a plan of a blank of sheet or plate metal from which the improved locking element is formed. Fig. 2 is a plan of the completed locking element. Fig. 3 is a section of the element in operative position on a screw. Fig. 4 is a sectional or fragmentary perspective of the element.

The invention is exemplified in a locking element which is formed of a blank of flat sheet or plate metal of sufficiently heavy stock to provide the desired or necessary strength and rigidity. The blank is first cut to the shape shown in Fig. 1 and includes stock for providing a flat hexagonal plate 10 which serves as the body of the element for engaging the work, such as an ordinary nut on a screw 20. This plate 10 is provided with a central hole 11, the margin of which is notched as at 10ª, and is helically bent or offset axially upward from the bottom face of said plate, as at 10ᵇ, to fit into and engage substantially one complete convolution of the groove of the screw-thread 21 of screw 20. The blank also includes portions which are bent upwardly from the top-face of plate 10 for forming integral right-angle or upstanding flanges 12 and is slit, as at 13, adjacent the margin of plate 10 for forming tongues 14 which extend inwardly from the flanges 12 toward the axis of hole 11. V-shaped teeth 15 are formed at the free or inner ends of tongues 14. The portions of the blank for flanges 12 and tongues 14 are bent to project upwardly substantially at right angles to plate 10 so the flanges 12 will form upstanding straight sides on the element. The tongues 14 are bent inwardly toward the axis of the locking element at angles shown in Fig. 2. These tongues 14, by reason of having only their outer ends attached to flanges 12, and their inner ends free, are slightly resilient transversely of the screw. Tongues 14 are bent so their teeth 15 will extend normally into the spiral of the screw thread and engage the sides of the thread (see Fig. 3). The tongues extend substantially radially at such angles relatively to their points of attachment with flanges 12 and the axis of the screw that they are slightly off dead-center. As a result of this, when the element is rotated to turn it onto the screw, the teeth 15 on the inner ends of the tongues will be free to flex outwardly and ride around the side-faces of the screw-thread 21 and, when rotative stresses are applied to turn the element off the screw, the frictional engagement of the screw with the teeth will cause the latter to be forced toward dead-center relation and result in the teeth 15 biting into the side-faces of the screw thread and automatically locking the element against rotation. The teeth 15 are V-shaped to conform substantially to the V-shaped groove and side-faces of the screw-thread so that, upon reverse rotation, the resistance of the tongues will produce a wedging fit of the teeth against and between the inclined side-faces of the screw-thread. The teeth 15 on tongues 14 are helically arranged in phase with, or conformably to, the screw-thread. Preferably, each tongue is provided with a sufficient number of teeth to insure sufficient frictional engagement effectively to lock the element against reverse rotation.

In Fig. 4 the element is shown in position to lock an ordinary nut on screw 20. The flange or portion 10ᵇ of plate 10 interfits with the screw-thread 21 and, when the element is forced against the work, increases the loading capacity of the element, by reason of the pressure exerted against the bottom face of the plate by the work.

In operation, the element is started upon the end of the screw with the helical flange portion 10ᵇ interfitting with the groove of the screw-thread, and then turned around the screw. If desired turning may be done by applying a wrench to the upstanding flanges 12. During the initial turning movement the tongues 14 will be flexed outwardly slightly by the screw-thread to produce a resilient engagement between the teeth 15 of tongues 14 and the V-shaped side-faces of the screw-thread. The angular direction of tongues 14 relatively to the axis of the screw, or from their dead-center off-set, is such that the inner or toothed ends of the tongues will flex outwardly and permit the teeth 15 to slide around the screw-thread. When the plate 10 has been forced against the work, the helical portion 10ᵇ will be jammed around one convolution of the groove of the screw-thread and teeth 15 of tongues 14 will be pressed against the side faces of the screw-thread, and this will greatly increase the load which may be imposed on the element. When pressure is exerted or vibration is produced, which imposes reverse rotative stresses on the element, stresses will be exerted on teeth 15 of tongues 14 to move the tongues toward their dead-center position and cause the teeth 15 to bite into the inclined side-faces of the screw-thread and thus lock the element against relative reverse rotation. The pressure exerted by the work against plate 10 will exert a pressure on the helical portion 10ᵇ to supplement the resistance to reverse rotative movement produced by tongues 14 and teeth 15.

The element may be released for reverse rotation by a suitable tool which is adapted to apply pressure in a direction to disengage the tongues from the thread.

The invention exemplifies a one-piece locking element comprising a plate or body for engaging the work having screw-threaded engagement with the screw and resilient tongues provided with teeth interfitting with the screw-thread and adapted automatically to prevent reverse rotation or locking of the element.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a nut-like locking element for use with a plain screw, formed of a sheet metal stamping and comprising a plate provided with a central hole therein for receiving the screw, and a plurality of elongated tongues extending in an annular series around the hole in the plate, having their outer ends integrally joined to the plate and their side-faces extending substantially at right angles to the plate, and provided at their inner ends with V-shaped teeth adapted when the element and screw are in assembled relation to fit between and engage the inclined side-faces of the screw-thread and arranged so that the tooth on the inner end of each tongue is offset relatively to the teeth on the adjacent tongues in the direction of the axis of the hole and in such manner that the teeth as a group are helically arranged in phase with, or conformably to, the spiral of the thread, the plate having a flange around the central hole shaped to receive and interfit with the thread of the screw, the tongues being laterally resilient and extending inwards in such direction that their teeth-equipped ends will slide on the side-faces of the thread when the element is turned onto the screw, and will bite into the side-faces when the element is urged rotatably off the screw.

2. As a new article of manufacture, a nut-like locking element for use with a plain screw, formed of a sheet metal stamping and comprising a plate provided with a central hole therein for receiving the screw, a plurality of upstanding marginal flanges integral with the plate and forming sides, a plurality of elongated tongues extending inwardly in an annular series around the hole in the plate, having their outer ends integrally joined to the flanges and their side faces extending substantially at right angles to the plate, and provided at their inner ends with V-shaped teeth adapted when the element and screw are in assembled relation to fit between and engage the inclined side-faces of the screw-thread and arranged so that the tooth on the inner end of each tongue is offset relatively to the teeth on the adjacent tongues in the direction of the axis of the hole and in such manner that the teeth as a group are helically arranged in phase with, or conformably to, the spiral of the thread, the plate being adapted to engage the work with which the screw is associated and having a helical flange around the central hole shaped to receive and interfit with the thread of the screw, the tongues being laterally resilient and extending inwards in such direction that their teeth-equipped ends will slide on the side-faces of the thread when the element is turned onto the screw, and will bite into the side faces when the element is urged rotatably off the screw.

ARTHUR H. THOMPSON.